United States Patent
Yu et al.

(10) Patent No.: US 12,417,066 B2
(45) Date of Patent: Sep. 16, 2025

(54) INFORMATION PROCESSING METHOD AND APPARATUS THEREOF, CLOUD TERMINAL, CLOUD SERVER, AND STORAGE MEDIUM

(71) Applicant: ZTE CORPORATION, Shenzhen (CN)

(72) Inventors: Yifang Yu, Shenzhen (CN); Xinhai Hua, Shenzhen (CN); Chen Qi, Shenzhen (CN); Zejin Xia, Shenzhen (CN); Rongmao Fu, Shenzhen (CN); Jianfeng Zhang, Shenzhen (CN); Changzheng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/695,920

(22) PCT Filed: Aug. 2, 2022

(86) PCT No.: PCT/CN2022/109789
§ 371 (c)(1),
(2) Date: Mar. 27, 2024

(87) PCT Pub. No.: WO2023/045572
PCT Pub. Date: Mar. 30, 2023

(65) Prior Publication Data
US 2024/0394005 A1    Nov. 28, 2024

(30) Foreign Application Priority Data
Sep. 27, 2021   (CN) .......................... 202111136323.X

(51) Int. Cl.
*G06F 3/14*   (2006.01)
*H04L 67/10*  (2022.01)

(52) U.S. Cl.
CPC ............. *G06F 3/1454* (2013.01); *H04L 67/10* (2013.01)

(58) Field of Classification Search
CPC ............................... G06F 3/1454; H04L 67/10
See application file for complete search history.

(56) References Cited

U.S. PATENT DOCUMENTS

2015/0016661 A1* 1/2015 Lord ................. H04N 21/42203
                                                    382/100
2016/0112497 A1* 4/2016 Koushik .............. G06Q 20/123
                                                    715/739
(Continued)

FOREIGN PATENT DOCUMENTS

CN        103888485 A    6/2014
CN        107302458 A   10/2017
(Continued)

OTHER PUBLICATIONS

International Searching Authority. International Search Report and Written Opinion for PCT Application No. PCT/CN2022/109789 and English translation, mailed Sep. 29, 2022, pp. 1-10.
(Continued)

*Primary Examiner* — Robert J Michaud
(74) *Attorney, Agent, or Firm* — Vivacqua Crane, PLLC

(57) ABSTRACT

Disclosed are an information processing method and apparatus, a cloud terminal device, a cloud server, and a storage medium. The information processing method is applied to an information processing apparatus and includes: receiving first cloud desktop information sent by a cloud terminal device, wherein the first cloud desktop information is one of remaining pieces of cloud desktop information to be processed after the cloud terminal device selects second cloud desktop information from a plurality of pieces of cloud desktop information to be processed, and the plurality of pieces of cloud desktop information to be processed are sent
(Continued)

by a cloud server to the cloud terminal device according to an information acquisition request sent by the cloud terminal device; performing signal form conversion on the first cloud desktop information to obtain first display information; and performing display processing on the first display information.

19 Claims, 11 Drawing Sheets

(56) References Cited

U.S. PATENT DOCUMENTS

2016/0253142 A1 9/2016 Choi et al.
2019/0196434 A1* 6/2019 Fujisawa ................. G06F 30/00

FOREIGN PATENT DOCUMENTS

| CN | 110990089 A | 4/2020 |
| CN | 112416483 A | 2/2021 |
| CN | 113094015 A | 7/2021 |

OTHER PUBLICATIONS

European Patent Office. Extended European Search Report for EP Application No. 22871630.4, mailed Jan. 20, 2025, pp. 1-7.

* cited by examiner

INFORMATION PROCESSING METHOD AND APPARATUS THEREOF, CLOUD TERMINAL, CLOUD SERVER, AND STORAGE MEDIUM

CROSS-REFERENCE TO RELATED APPLICATIONS

This application is a national stage filing under 35 U.S.C. § 371 of international application number PCT/CN2022/109789, filed Aug. 2, 2022, which claims priority to Chinese patent application No. 202111136323.X, filed Sep. 27, 2021. The contents of these applications are incorporated herein by reference in their entirety.

TECHNICAL FIELD

The present disclosure relates to the field of information processing technologies, in particular to an information processing method and apparatus, a cloud terminal device, a cloud server, and a non-transitory computer-readable storage medium.

BACKGROUND

Cloud desktop is a new alternative to a traditional computer, utilizing virtual technology to virtualize various physical devices. As the market recognition and popularity of cloud desktop continue to grow, users' requirements for cloud desktop products are also increasing, especially the growing requirement for independent display on multiple monitors in a cloud desktop scenario. Herein, "multi-monitor" in "independent display on multiple monitors" means that there are a plurality of monitors on a user side for displaying image information at the same time, and "independent display" in "independent display on multiple monitors" means that different monitors need to present different application images. Independent display on multiple monitors is especially suitable for uses in surveillance, programming, software development and other scenarios.

To meet the requirement of independent display on multiple monitors, a cloud terminal device needs to have a powerful Graphics Processing Unit (GPU). However, this contradicts the prevailing industry trend to simplify a configuration of a cloud terminal device and reduce costs of the cloud terminal device. Therefore, how to enable the cloud terminal device to meet the requirement of independent display on multiple monitors without increasing configuration and costs of the cloud terminal device is an urgent technical problem to be solved.

SUMMARY

The following is a summary of the subject matters described in detail herein, which is not intended to limit the scope of protection of the claims.

In embodiments of the present disclosure provided are an information processing method and apparatus, a cloud terminal device, a cloud server and a storage medium.

In accordance with a first aspect of the present disclosure, in an embodiment provided is an information processing method. The method is applied to an information processing apparatus, and includes:

receiving first cloud desktop information sent by a cloud terminal device, where the first cloud desktop information is one of remaining pieces of cloud desktop information to be processed after the cloud terminal device selects second cloud desktop information from a plurality of pieces of cloud desktop information to be processed, and the plurality of pieces of cloud desktop information to be processed are sent by a cloud server to the cloud terminal device according to an information acquisition request sent by the cloud terminal device;

performing signal form conversion on the first cloud desktop information to obtain first display information; and performing display processing on the first display information.

In accordance with a second aspect of the present disclosure, in another embodiment further provided is an information processing method. The method is applied to a cloud terminal device, and includes:

sending an information acquisition request to a cloud server so that the cloud server acquires a plurality of pieces of cloud desktop information to be processed according to the information acquisition request;

receiving the plurality of pieces of cloud desktop information to be processed sent by the cloud server;

selecting first cloud desktop information and second cloud desktop information from the plurality of pieces of cloud desktop information to be processed, where the first cloud desktop information is one of remaining cloud desktop information to be processed after the cloud terminal device selects the second cloud desktop information from the plurality of pieces of cloud desktop information to be processed;

sending the first cloud desktop information to an information processing apparatus so that the information processing apparatus performs display processing according to the first cloud desktop information;

performing signal form conversion on the second cloud desktop information to obtain second display information; and performing display processing on the second display information.

In accordance with a third aspect of the present disclosure, in yet another embodiment further provided is an information processing method. The method is applied to a cloud server, and includes:

receiving an information acquisition request sent by a cloud terminal device;

acquiring a plurality of pieces of cloud desktop information to be processed according to the information acquisition request; and sending the plurality of pieces of cloud desktop information to be processed to the cloud terminal device, so that the cloud terminal device selects second cloud desktop information from the plurality of pieces of cloud desktop information to be processed and performs display processing according to the second cloud desktop information, and the cloud terminal device sends, after selecting the second cloud desktop information, first cloud desktop information in remaining cloud desktop information to be processed to an information processing apparatus for display processing.

In accordance with a fourth aspect of the present disclosure, in a further embodiment provided is an information processing apparatus, including a memory, a processor, and a computer program stored in the memory and executable by the processor. The computer program, when executed by the processor, causes the processor to implement the information processing method of the first aspect.

In accordance with a fifth aspect of the present disclosure, in an embodiment further provided is a cloud terminal device, including: a memory, a processor, and a computer program stored in the memory and executable by the processor. The computer program, when executed by the processor, causes the processor to implement the information processing method of the second aspect.

In accordance with a sixth aspect of the present disclosure, in an embodiment further provided is a cloud server, including: a memory, a processor, and a computer program stored in the memory and executable by the processor. The computer program, when executed by the processor, causes the processor to implement the information processing method of the third aspect.

In accordance with a seventh aspect of the present disclosure, in an embodiment further provided is a non-transitory computer-readable storage medium storing computer-executable instructions for performing the information processing method described above.

In accordance with an eighth aspect of the present disclosure, in an embodiment further provided is a computer program product, including a computer program or computer instructions stored in a computer-readable storage medium, from which a processor of a computer device reads the computer program or the computer instructions. The computer program or the computer instructions, when executed by the processor, cause the computer device to perform the information processing method described above.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure clearer, the present disclosure is further described in detail in conjunction with the accompanying drawings and embodiments. It should be understood that the particular embodiments described herein are only intended to elaborate the present disclosure, and are not intended to limit the present disclosure.

It is to be noted that although a logical order is shown in the flowcharts, the steps shown or described may be performed, in some cases, in a different order from the order shown or described in the flowcharts. The terms such as "first" and "second" in the description, claims and above-mentioned drawings are intended to distinguish between similar objects and are not necessarily to describe a specific order or sequence.

The present disclosure provides an information processing method and apparatus, a cloud terminal device, a cloud server, and a storage medium. An information processing apparatus first receives first cloud desktop information sent by the cloud terminal device, where the first cloud desktop information is one of remaining cloud desktop information to be processed after the cloud terminal device selects second cloud desktop information from a plurality of pieces of cloud desktop information to be processed, and the plurality of pieces of cloud desktop information to be processed are sent by the cloud server to the cloud terminal device according to an information acquisition request sent by the cloud terminal device; performs signal form conversion on the first cloud desktop information to obtain first display information; and performs display processing on the first display information. The first cloud desktop information is one of the remaining cloud desktop information to be processed after the cloud terminal device selects the second cloud desktop information from the plurality of pieces of cloud desktop information to be processed sent by the cloud server. Therefore, the information processing apparatus may perform display processing on the first display information when the cloud terminal device performs display processing on the second cloud desktop information. In other words, independent display on multiple monitors can be achieved by using the information processing apparatus without upgrading a hardware configuration of the cloud terminal device, thus meeting a requirement of independent display on multiple monitors without increasing configuration and costs of the cloud terminal device.

The embodiments of the present disclosure will be further elaborated below with reference to the accompanying drawings.

Figure 1:
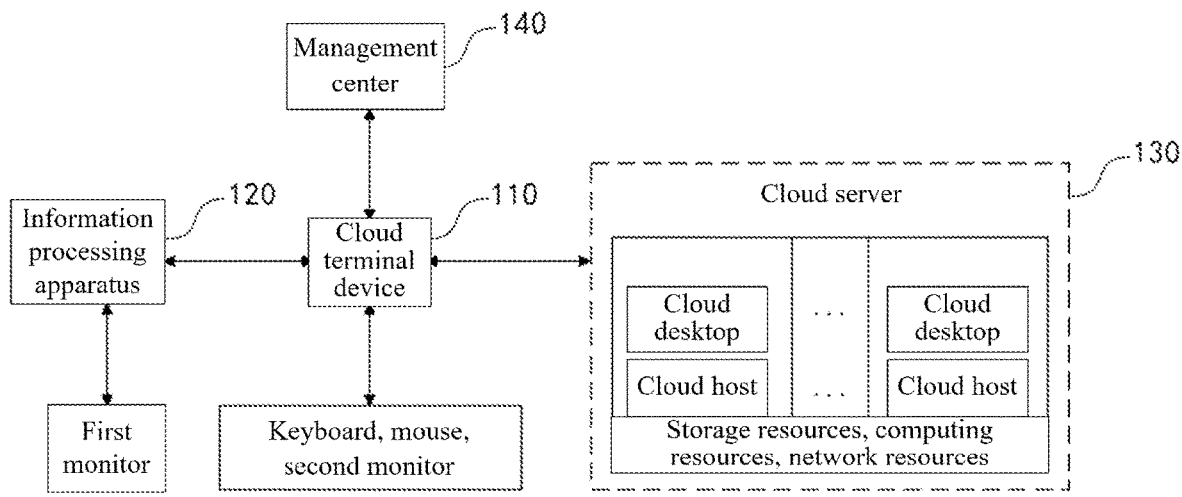
FIG. 1 is a schematic diagram of a system architecture for performing an information processing method according to an embodiment of the present disclosure.

FIG. 1 is a schematic diagram of a system architecture for performing an information processing method according to an embodiment of the present disclosure. In the example shown in FIG. 1, the system architecture includes a cloud terminal device 110, an information processing apparatus 120, a cloud server 130, and a management center 140. Herein, the cloud terminal device 110 is communicatively connected to the information processing apparatus 120. The cloud terminal device 110 is communicatively connected to each of the cloud server 130 and the management center 140.

The cloud terminal device 110 is connected to external devices such as a keyboard, a mouse, and a monitor, and can provide a user with a related operation path for operating the cloud terminal device 110 through these external devices. In response to the user's operation of accessing a cloud desktop at the cloud terminal device 110 through the keyboard and the mouse, the cloud terminal device 110 may acquire relevant cloud desktop information from the cloud server 130 and then display the cloud desktop information through the monitor connected to the cloud terminal device 110.

Figure 2:
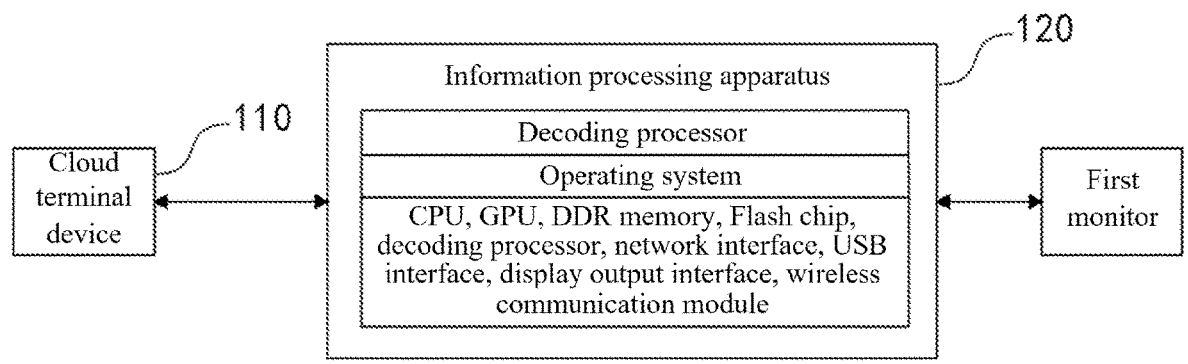
FIG. 2 is a schematic diagram of an architecture of an information processing apparatus according to an embodiment of the present disclosure.

As shown in FIG. 2, the information processing apparatus 120 is provided with hardware devices such as a Central Processing Unit (CPU), a GPU, a double data rate (DDR) memory, a Flash chip, a decoding processor, a network interface, a USB interface, a display output interface, and a wireless communication module. The information processing apparatus 120 may communicate with the cloud terminal device 110 through the network interface, the USB interface, the wireless communication module (for example, a Wi-Fi communication module, a Bluetooth communication module, a ZigBee communication module). Alternatively, the information processing apparatus 120 may be an apparatus provided inside the cloud terminal device 110. In addition, the information processing apparatus 120 may be connected to a monitor through the display output interface. In response to a user connecting the cloud terminal device 110 to the information processing apparatus 120 to which the monitor is connected in a wired or wireless manner, the information processing apparatus 120 may receive cloud desktop information sent from the cloud terminal device 110, and perform relevant decoding processing on the cloud desktop information and display the cloud desktop information through the monitor. It should be noted that the information processing apparatus 120 can decode and perform display processing on the cloud desktop information independently of the cloud terminal device 110. In addition, the information processing apparatus 120 may be deployed on various mainstream operating systems currently available in the market, such as the Android system, the iOS system, the HarmonyOS system, or the Linux system. This is not specifically limited in this embodiment. Further, it should be noted that when the information processing apparatus 120 is connected to the cloud terminal device 110 through the USB interface, the cloud terminal device 110 can support hot-swapping of the information processing apparatus 120.

The cloud server 130 can exchange information with the cloud terminal device 110. For example, in response to a request for obtaining cloud desktop information initiated by the cloud terminal device 110, the cloud server 130 may send at least one piece of cloud desktop information to the cloud terminal device 110 according to the request, so that the cloud terminal device 110 and the information processing apparatus 120 obtain respective cloud desktop information from the at least one piece of cloud desktop information and perform related decoding processing and display processing.

The management center 140 can exchange information with the cloud terminal device 110. For example, in response to a service authentication request initiated by the cloud terminal device 110, the management center 140 may perform authentication processing according to the service authentication request. When the authentication succeeds, the management center 140 may return relevant authentication information to the cloud terminal device 110, so that the cloud terminal device 110 can exchange information with the cloud server 130 according to the authentication information.

The system architecture and an application scenario described in the embodiment of the present disclosure are for more clearly describing the technical schemes of the embodiments of the present disclosure, and do not constitute a limitation on the technical schemes provided by the embodiments of the present disclosure. Those having ordinary skill in the art may understand that, with evolution of the system architecture and emergence of new application scenarios, the technical schemes provided by the embodiments of the present disclosure are also applicable to similar technical problems.

Those of ordinary skill in the art may understand that the system architecture shown in FIG. 1 does not constitute a limitation on the embodiments of the present disclosure, and there may be more or fewer components than illustrated, or some of the components may be combined, or a different arrangement of the components may be used.

Based on the above system architecture, various embodiments of the information processing method of the present disclosure are described below.

Figure 3:
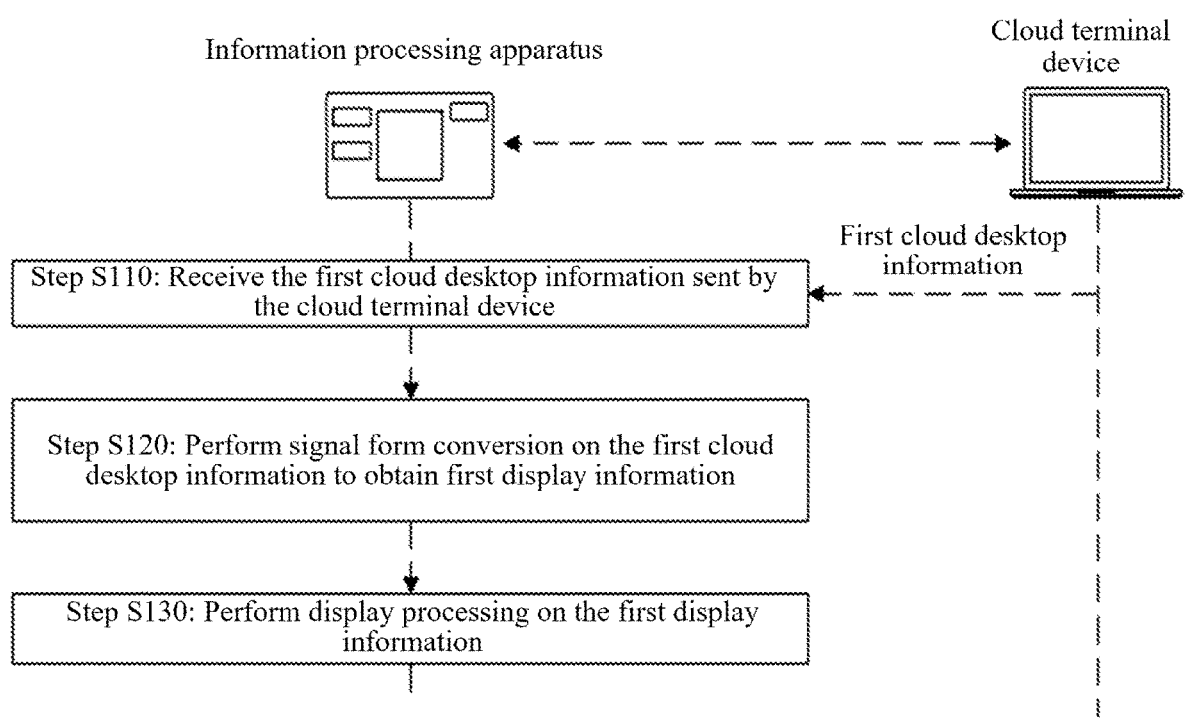
FIG. 3 is a flowchart of an information processing method according to an embodiment of the present disclosure.

FIG. 3 is a flowchart of an information processing method according to an embodiment of the present disclosure. The information processing method may be applied to, for example, the information processing apparatus 120 in the system architecture shown in FIG. 1. The information processing method may include but is not limited to steps S110 to S130.

At S110, first cloud desktop information sent by a cloud terminal device is received.

It should be noted that, the first cloud desktop information is one of remaining cloud desktop information to be processed after the cloud terminal device selects second cloud desktop information from a plurality of pieces of cloud desktop information to be processed. The plurality of pieces of cloud desktop information to be processed are sent by a cloud server to the cloud terminal device according to an information acquisition request sent by the cloud terminal device.

It should be noted that, the cloud terminal device may send the information acquisition request for obtaining a plurality of pieces of cloud desktop information to the cloud server. When the cloud server receives the information acquisition request, the cloud server may correspondingly generate a plurality of pieces of cloud desktop information to be processed and send the cloud desktop information to be processed to the cloud terminal device. After the cloud terminal device receives the cloud desktop information to be processed, the cloud terminal device may first select the required second cloud desktop information from the cloud desktop information to be processed and decode and perform display processing on the second cloud desktop information. Then, the cloud terminal device sends remaining cloud desktop information to be processed to the corresponding information processing apparatus, for example, the cloud terminal device sends the first cloud desktop information in the remaining cloud desktop information to be processed to the information processing apparatus, so that the information processing apparatus can decode and perform display processing on the first cloud desktop information in a subsequent step.

It should be noted that the plurality of pieces of cloud desktop information to be processed sent by the cloud server may be the same piece of cloud desktop information or may be different pieces of cloud desktop information, which is not specifically limited in this embodiment. For example, the first cloud desktop information and the second cloud desktop information may be cloud desktop information (for example, desktop content displayed when a user just opens a cloud desktop client) for displaying the same desktop content. For another example, the first cloud desktop information and the second cloud desktop information may be cloud desktop information used for displaying different application interfaces (for example, the first cloud desktop information is used for displaying an interface of an information application, and the second cloud desktop information is used for displaying an interface of an instant messaging application).

At S120, signal form conversion is performed on the first cloud desktop information to obtain first display information.

In this step, since the first cloud desktop information sent by the cloud terminal device is received in S110, the first display information can be obtained by performing signal form conversion on the first cloud desktop information, so that display processing can be performed on the first display information in a subsequent step, and a use requirement of the user on independent display on multiple monitors can be met.

It should be noted that there are different implementations for performing signal form conversion on the first cloud desktop information to obtain the first display information, and an appropriate implementation may be selected according to an actual application situation, which is not specifically limited in this embodiment. For example, when a default playback format supported by the information processing apparatus is consistent with a playback format supported by the monitor, the first cloud desktop information can be decoded to obtain the first display information. For another example, when a default playback format supported by the information processing apparatus is inconsistent with a playback format supported by the monitor, the first cloud desktop information can be decoded to obtain display information to be processed, and then the display information to be processed is transcoded to obtain the first display information, so that the first display information can conform to the playback format supported by the monitor.

At S130, display processing is performed on the first display information.

In this step, since the first display information is obtained in S120, display processing can be performed on the first display information can be displayed to meet the user requirement of the user for independent display on multiple monitors.

It should be noted that display processing can be performed on the first display information in different implementations, and an appropriate implementation may be selected according to an actual application situation, which is not specifically limited in this embodiment. For example, when the information processing apparatus is connected to a monitor through the cloud terminal device (for example, the information processing apparatus is embedded into the cloud terminal device and the monitor display corresponding to the information processing apparatus is connected through a display output interface provided by the cloud terminal device), the information processing apparatus can transparently transmit, through the cloud terminal device, the first display information to the monitor for display. In another example, when the information processing apparatus is directly connected to a monitor (for example, the information processing apparatus is provided outside of the cloud terminal device and the information processing apparatus is connected to each of the cloud terminal device and the monitor), the information processing apparatus may directly transmit the first display information to the monitor for display.

In a related technology, independent display on multiple monitors in a cloud desktop scenario mainly depends on processing capabilities of the cloud server and the cloud terminal device, and the key point lies in a GPU capability of the cloud terminal device. When receiving the request for obtaining cloud desktop information from the cloud terminal device, the cloud server sends the relevant cloud desktop information (for example, a data stream of desktop image display) to the cloud terminal device through a desktop transfer protocol. After the cloud terminal device receives the cloud desktop information, the cloud terminal device decodes the cloud desktop information, then writes decoded cloud desktop information into a graphics card memory, and then displays the decoded cloud desktop information through the monitor. When the user has a requirement of independent display on multiple monitors, a desktop computer, a notebook or another cloud terminal device with higher performance is usually used as a device to access the cloud server. Such devices feature strong performance and rich interfaces, and can connect monitors through various interfaces such as DisplayPort (DP), High Definition Multimedia Interface (HDMI) and Video Graphics Array (VGA). However, a current independent display on multiple monitors scheme contradicts the prevailing industry trend to simplify a configuration of the cloud terminal device and reduce costs of the cloud terminal device. In addition, for cloud terminal devices, manufacturers often choose cost-effective chip devices out of consideration for costs. Overall capabilities of such chip devices are weak. Although such chip devices can meet common decoding processing on cloud desktop information, they generally do not support independent display on multiple monitors or support independent display on multiple monitors but at a low frame rate, which cannot meet a display requirement for the use of a cloud desktop.

In order to solve the above technical problems existing in the related technology, in this embodiment, by using the information processing method including the steps S110 to S130, the information processing apparatus first receives the first cloud desktop information sent by the cloud terminal device, where the first cloud desktop information is one of remaining cloud desktop information to be processed after the cloud terminal device selects the second cloud desktop information from the plurality of pieces of cloud desktop information to be processed, and the plurality of pieces of cloud desktop information to be processed are sent by the cloud server to the cloud terminal device according to the information acquisition request sent by the cloud terminal device; performs signal form conversion on the first cloud desktop information to obtain the first display information; and performs display processing on the first display information. The first cloud desktop information is one of the remaining cloud desktop information to be processed after the cloud terminal device selects the second cloud desktop information from the plurality of pieces of cloud desktop information to be processed sent by the cloud server. Therefore, the information processing apparatus may perform display processing on the first display information when the cloud terminal device performs display processing on the second cloud desktop information. In other words, independent display on multiple monitors can be achieved by using the information processing apparatus without upgrading a hardware configuration of the cloud terminal device, thus meeting the requirement of independent display on multiple monitors without increasing configuration and costs of the cloud terminal device. In addition, the information processing apparatus can be hot-swapped to the cloud terminal device. As the information processing apparatus is used to realize a function of independent display on multiple monitors, the scheme provided by this embodiment has good extension and reusability, thereby meeting the use requirement of the user for independent display on multiple monitors.

Figure 4:
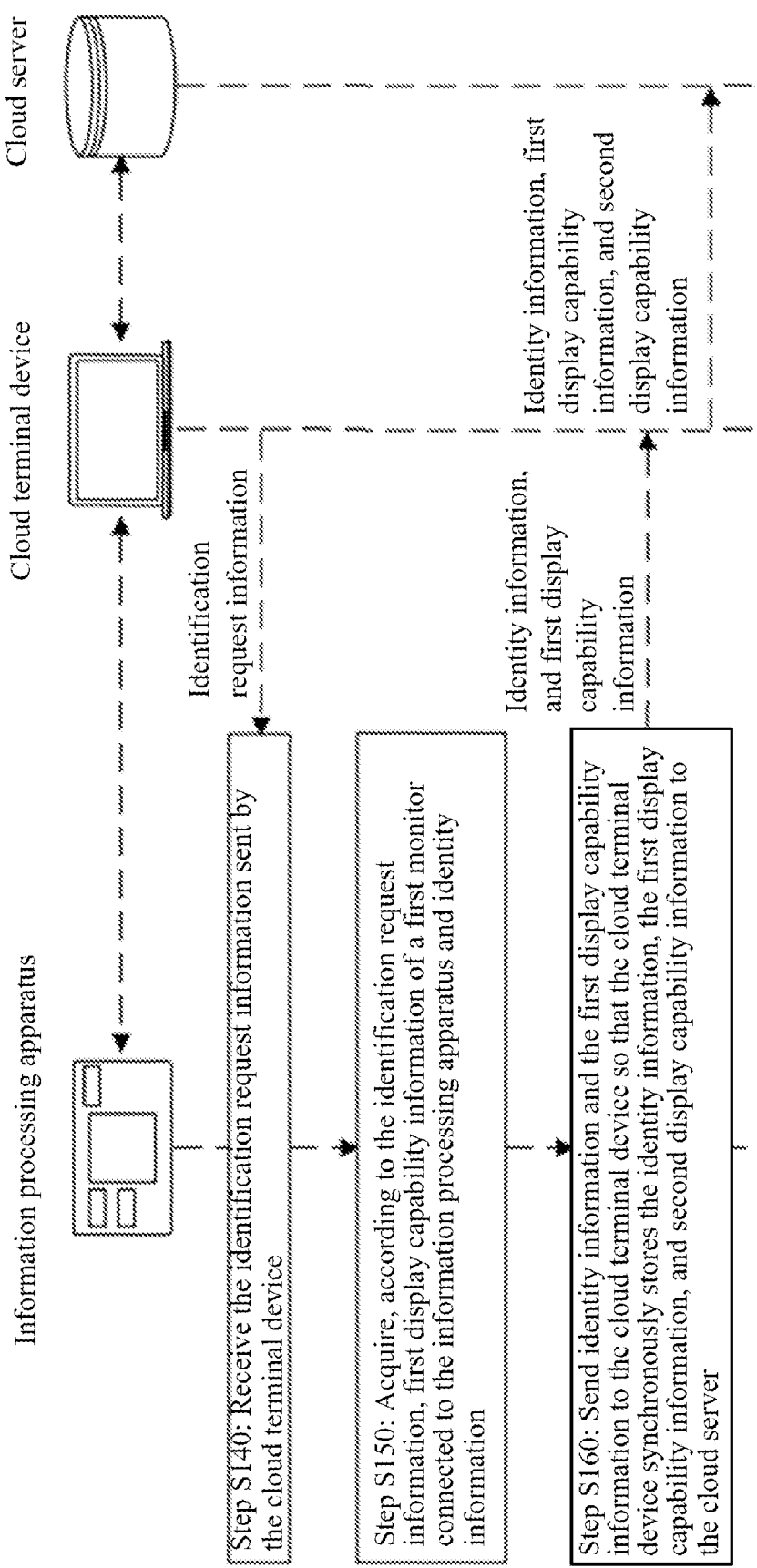
FIG. 4 is a flowchart of an information processing method according to another embodiment of the present disclosure.

In an embodiment, as shown in FIG. 4, the information processing method is further described. The information processing method may further include but is not limited to steps S140, S150, and S160 before the execution of S110.

At S140, identification request information sent by the cloud terminal device is received.

In this step, when the information processing apparatus is connected to the cloud terminal device, the cloud terminal device performs identification processing on the information processing apparatus, to realize management of the information processing apparatus. Therefore, after the information processing apparatus is connected to the cloud terminal device, the information processing apparatus receives the identification request information from the cloud terminal device, so as to send relevant device information to the cloud terminal device according to the identification request information in a subsequent step. In this way, the cloud terminal device realizes the management of the information processing apparatus.

At S150, first display capability information of a first monitor connected to the information processing apparatus and identity information are acquired according to the identification request information.

In this step, since the identification request information sent by the cloud terminal device is received in S140, the information processing apparatus can obtain, according to the identification request information, its own identity information and the first display capability information of the first monitor connected to the information processing apparatus. Then, the identity information and the first display capability information can be sent to the cloud terminal device in a subsequent step, so that the cloud terminal device can manage the information processing apparatus according to the identity information and the first display capability information, and request cloud desktop information matching the first monitor from the cloud server.

It should be noted that the identity information is used to uniquely identify the information processing apparatus, and different information processing apparatuses have different identity information. The first display capability information may include capability information supported by the first monitor, such as resolution information and Dots Per Inch (DPI) information, which is not specifically limited in this embodiment.

At S160, the identity information and the first display capability information are sent to the cloud terminal device so that the cloud terminal device synchronously stores the identity information, the first display capability information, and second display capability information to the cloud server.

It should be noted that the second display capability information is obtained by the cloud terminal device from a second monitor connected to the cloud terminal device.

In this step, because the identity information of the information processing apparatus and the first display capability information of the first monitor are acquired in S150, the identity information and the first display capability information can be sent to the cloud terminal device. Then, the cloud terminal device can synchronously store the identity information, the first display capability information, and the second display capability information to the cloud server, so that the cloud server can send a plurality of different pieces of cloud desktop information to be processed to the cloud terminal device according to the identity information, the first display capability information, and the second display capability information in a subsequent step. In this way, the cloud terminal device and the information processing apparatus can respectively display different cloud desktop information to be processed and realize the function of independent display on multiple monitors.

It should be noted that the second display capability information may include capability information supported by the second monitor such as resolution information and DPI information, which is not specifically limited in this embodiment.

It should be noted that the first cloud desktop information is generated by the cloud server according to the identity information and the first display capability information. The second cloud desktop information is generated by the cloud server according to the second display capability information.

It should be noted that the information processing apparatus and the cloud terminal device may exchange data through a USB protocol, a network application layer protocol, or the like, and an appropriate protocol may be selected according to an actual application condition, which is not specifically limited in this embodiment.

In this embodiment, according to the information processing method including steps S140 to S160, after the information processing apparatus is connected to the cloud terminal device, the first display capability information of the first monitor connected to the information processing apparatus and the identity information are acquired according to the identification request information sent by the cloud terminal device. Then, the identity information and the first display capability information are sent to the cloud terminal device. Then, the cloud terminal device synchronously stores the identity information, the first display capability information, and the second display capability information to the cloud server, so that the cloud server can send a plurality of different pieces of cloud desktop information to be processed to the cloud terminal device according to the identity information, the first display capability information, and the second display capability information. In this way, the cloud terminal device and the information processing apparatus can respectively display different cloud desktop information to be processed and realize the function of independent display on multiple monitors. In addition, the cloud terminal device synchronously stores the identity information, the first display capability information, and the second display capability information to the cloud server. In other words, the cloud terminal device also stores the identity information, the first display capability information, and the second display capability information. Therefore, the cloud terminal device can manage the information processing apparatus according to the identity information. For example, when the cloud terminal device is connected to a plurality of information processing apparatuses, the cloud terminal device can correspondingly send cloud desktop information to the information processing apparatuses according to the identity information, so that different information processing apparatuses can display different cloud desktop information, thereby meeting the use requirement of the user for independent display on multiple monitors.

Figure 5:
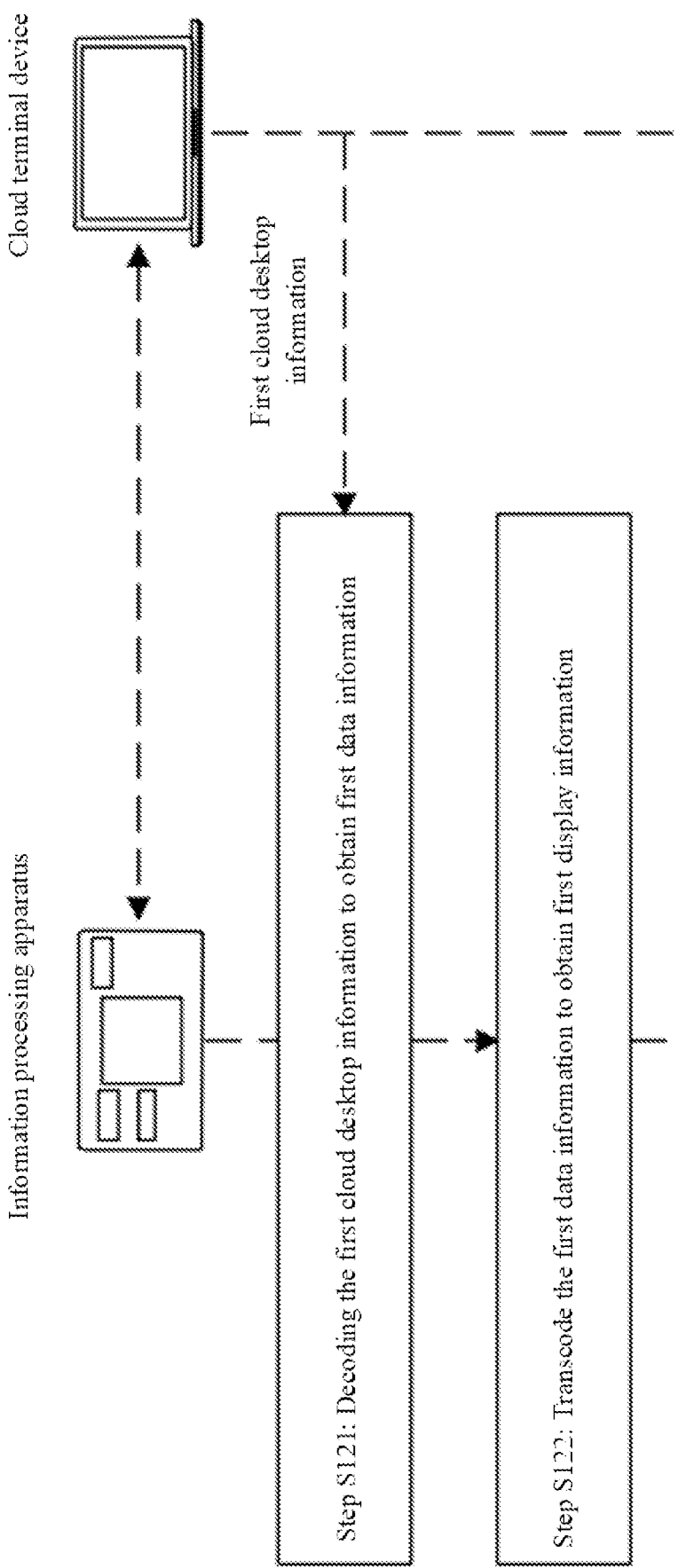
FIG. 5 is a flowchart of a specific method of S120 in FIG. 3.

In an embodiment, as shown in FIG. 5, S120 is further described, which may include but is not limited to the following steps:

At S121, the first cloud desktop information is decoded to obtain first data information.

At S122, the first data information is transcoded to obtain the first display information.

It should be noted that after receiving the first cloud desktop information sent by the cloud terminal device in S110, the information processing apparatus may decode the first cloud desktop information to obtain data information that can be displayed by the first monitor. However, in some cases, the data information obtained by decoding the first cloud desktop information by the information processing apparatus may not meet a display parameter requirement of the first monitor, which may lead to abnormal display. In order to overcome this problem, in this embodiment, after the first cloud desktop information is decoded to obtain the first data information, the first data information is transcoded to obtain the first display information, so that the first display information can meet the display parameter requirement of the first monitor. This avoids abnormal display and improves use experience of the user.

It should be noted that decoding processing is a process of restoring data to content represented by the data, or converting electrical pulse signals, optical signals, radio waves, or the like into information, data, or the like represented by them. Transcoding process is a process of converting a signal from one data format to another data format.

Further, in an embodiment, S130 is further described, which may include but is not limited to the following steps:

the first display information is written into a first graphics card memory so that the first monitor performs image display according to the first display information in the first graphics card memory, where the first graphics card memory is disposed in the information processing apparatus.

In this embodiment, because the first display information is obtained by performing signal form conversion on the first cloud desktop information in S120, the first display information can be written into the first graphics card memory disposed in the information processing apparatus, so that the first monitor connected to the information processing apparatus can perform image display according to the first display information in the first graphics card memory. As the first monitor performs image display according to the first display information in the first graphics card memory, this is independent of the cloud terminal device displaying second cloud desktop information, thereby meeting the use requirement of the user for independent display on multiple monitors.

It should be noted that as different information processing apparatuses are provided with different graphics card memories, each information processing apparatus can perform image display through a monitor connected to the information processing apparatus, thereby further meeting the use requirement of the user for independent display on multiple monitors.

Figure 6:
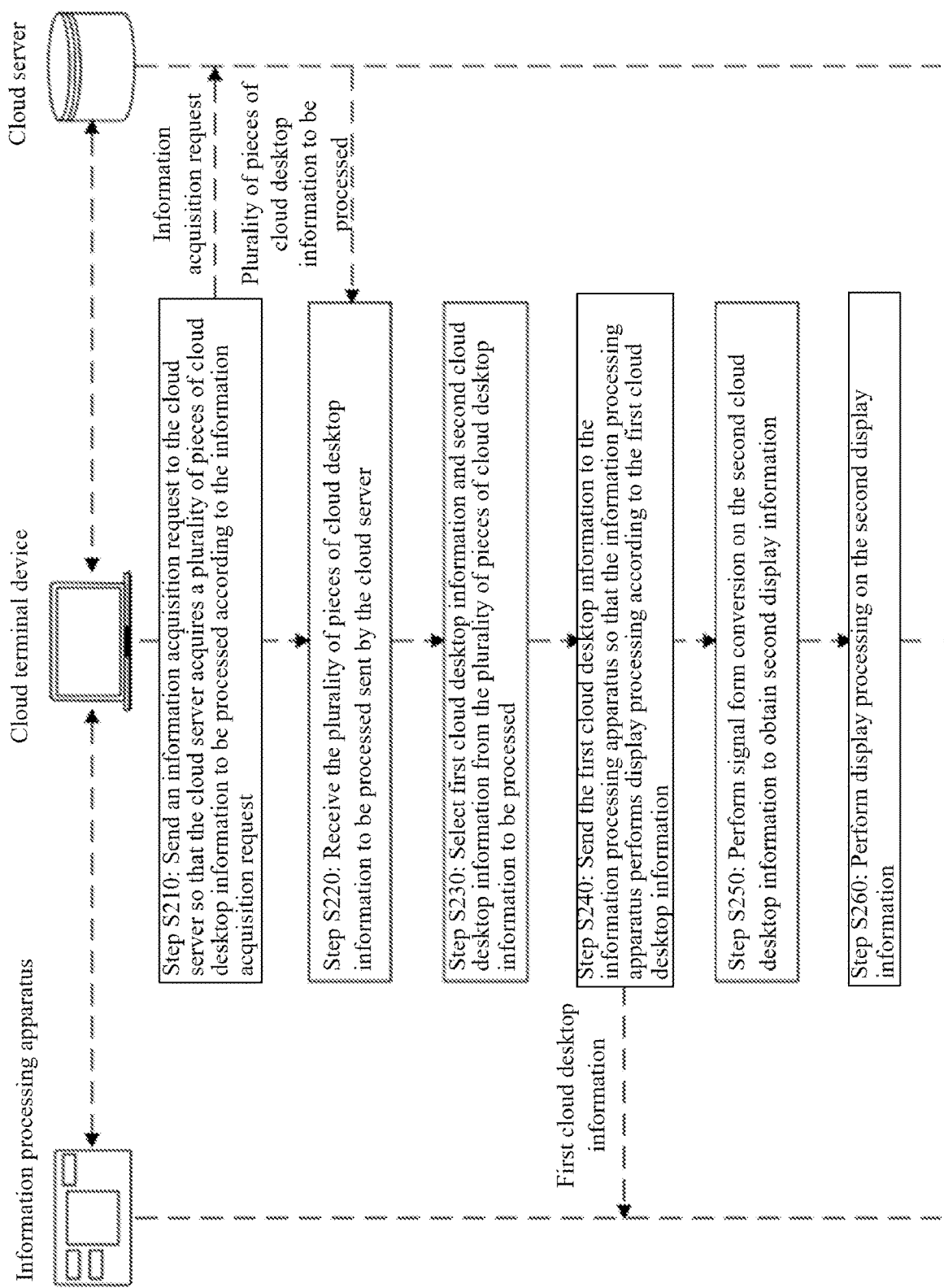
FIG. 6 is a flowchart of an information processing method according to another embodiment of the present disclosure.

FIG. 6 is a flowchart of another information processing method according to an embodiment of the present disclosure. The information processing method may be applied to, for example, the cloud terminal device 110 in the system architecture shown in FIG. 1. The information processing method may include but is not limited to steps S210 to S260.

At S210, an information acquisition request is sent to a cloud server so that the cloud server acquires a plurality of pieces of cloud desktop information to be processed according to the information acquisition request.

It should be noted that when a user accesses the cloud server through a cloud terminal device to request cloud desktop information, the cloud terminal device may send the information acquisition request for obtaining a plurality of pieces of cloud desktop information to the cloud server. After receiving the information acquisition request, the cloud server may correspondingly generate the plurality of pieces of cloud desktop information to be processed according to the information acquisition request, to send the pieces of cloud desktop information to be processed to the cloud terminal device in a subsequent step. The cloud terminal device can distribute the pieces of cloud desktop information to be processed to different information processing apparatuses for display processing, to achieve independent display on multiple monitors.

It should be noted that the plurality of pieces of cloud desktop information to be processed acquired by the cloud server according to the information acquisition request may be the same piece of cloud desktop information or may be different pieces of cloud desktop information, which is not specifically limited in this embodiment.

At S220, the plurality of pieces of cloud desktop information to be processed sent by the cloud server are received.

In this step, the information acquisition request is sent to the cloud server in S210, and the cloud server acquires the plurality of pieces of cloud desktop information to be processed according to the information acquisition request. Then the pieces of cloud desktop information to be processed sent by the cloud server are received, so that in a subsequent step, corresponding second cloud desktop information can be selected from the pieces of cloud desktop information to be processed and displayed, and the pieces of cloud desktop information to be processed can be distributed to different information processing apparatuses for display processing, thereby achieving independent display on multiple monitors.

At S230, first cloud desktop information and second cloud desktop information are selected from the plurality of pieces of cloud desktop information to be processed.

It should be noted that, the first cloud desktop information is one of remaining cloud desktop information to be processed after the cloud terminal device selects the second cloud desktop information from the plurality of pieces of cloud desktop information to be processed.

In this step, because the plurality of pieces of cloud desktop information to be processed sent by the cloud server are received in S220, the corresponding second cloud desktop information can be selected from the pieces of cloud desktop information to be processed, and then the remaining cloud desktop information to be processed except the second cloud desktop information can be distributed to different information processing apparatuses. For example, when there are two pieces of cloud desktop information to be processed (that is, the cloud terminal device is connected to an information processing apparatus), the cloud terminal device first selects the second cloud desktop information from the two pieces of cloud desktop information to be processed. In this case, the remaining cloud desktop information to be processed is the first cloud desktop information. Then the cloud terminal device sends the first cloud desktop information to the information processing apparatus. For another example, when there are a plurality of pieces of cloud desktop information to be processed (that is, the cloud terminal device is connected to a plurality of information processing apparatuses), the cloud terminal device first selects the second cloud desktop information from the pieces of cloud desktop information to be processed, then selects corresponding first cloud desktop information for one of the information processing apparatuses from remaining cloud desktop information to be processed, and then selects corresponding cloud desktop information to be processed for another information processing apparatus from remaining cloud desktop information to be processed until the distribution of the cloud desktop information to be processed is completed.

It should be noted that the cloud terminal device may select the corresponding second cloud desktop information from the plurality of pieces of cloud desktop information to be processed according to identity information of the cloud terminal device. In addition, the cloud terminal device may obtain identity information of the information processing apparatus in advance, and then select the corresponding first cloud desktop information from the cloud desktop information to be processed according to the identity information.

It should be noted that the first cloud desktop information and the second cloud desktop information may be cloud desktop information (for example, desktop content displayed when a user just opens a cloud desktop client) used for displaying the same desktop content, or may be cloud desktop information used for displaying different application interfaces (for example, the first cloud desktop information is used for displaying an interface of an information application, and the second cloud desktop information is used for displaying an interface of an instant messaging application). This is not specifically limited in this embodiment.

At S240, the first cloud desktop information is sent to an information processing apparatus so that the information processing apparatus performs display processing according to the first cloud desktop information.

In this step, since the first cloud desktop information is selected in S230, the first cloud desktop information can be sent to the information processing apparatus, so that the information processing apparatus can perform display processing according to the first cloud desktop information, thereby satisfying a use requirement of the user for independent display on multiple monitors.

It should be noted that after selecting the first cloud desktop information, the cloud terminal device can directly send the first cloud desktop information to the information processing apparatus, or perform data format conversion on the first cloud desktop information first, and then send first cloud desktop information which has undergone data format conversion to the information processing apparatus, which can be properly processed according to an actual application situation. This is not specifically limited in this embodiment.

It should be noted that the cloud terminal device and the information processing apparatus may exchange data through a USB protocol, a network application layer protocol, or the like, and an appropriate protocol may be selected according to an actual application condition, which is not specifically limited in this embodiment.

At S250, signal form conversion is performed on the second cloud desktop information to obtain second display information.

In this step, since the second cloud desktop information is selected in S230, the second display information can be obtained by performing signal form conversion on the second cloud desktop information, so that display processing can be performed on the second display information in a subsequent step, and the use requirement of the user for independent display on multiple monitors can be met.

It should be noted that there are different implementations for performing signal form conversion on the second cloud desktop information to obtain the second display information, and an appropriate implementation may be selected according to an actual application situation, which is not specifically limited in this embodiment. For example, when a default playback format supported by the cloud terminal device is consistent with a playback format supported by the monitor, the second cloud desktop information can be decoded to obtain the second display information. For another example, when a default playback format supported by the cloud terminal device is inconsistent with a playback format supported by the monitor, the second cloud desktop information can be decoded to obtain display information to be processed, and then the display information to be processed is transcoded to obtain the second display information, so that the second display information can conform to the playback format supported by the monitor.

At S260, display processing is performed on the second display information.

In this step, since the second display information is obtained in S250, display processing can be performed on the second display information to meet the user requirement of the user for independent display on multiple monitors.

In this embodiment, according to the information processing method including steps S210 to S260, the cloud terminal device first sends the information acquisition request to the cloud server, so that the cloud server acquires the plurality of pieces of cloud desktop information to be processed according to the information acquisition request. Then, the cloud terminal device selects the first cloud desktop information and the second cloud desktop information from the received plurality of pieces of cloud desktop information to be processed sent by the cloud server, and then sends the first cloud desktop information to the information processing apparatus, so that the information processing apparatus performs display processing according to the first cloud desktop information. Then, the cloud terminal device performs signal form conversion on the second cloud desktop information to obtain the second display information, and performs display processing on the second display information. The first cloud desktop information is one of the remaining cloud desktop information to be processed after the cloud terminal device selects the second cloud desktop information from the plurality of pieces of cloud desktop information to be processed. Therefore, the information processing apparatus may perform display processing on the first display information when the cloud terminal device performs display processing on the second display information. In other words, independent display on multiple monitors can be achieved by using the information processing apparatus without upgrading a hardware configuration of the cloud terminal device, thus meeting the requirement of independent display on multiple monitors without increasing configuration and costs of the cloud terminal device. In addition, the cloud terminal device supports hot-swapping of the information processing apparatus. As the information processing apparatus is used to realize a function of independent display on multiple monitors, the scheme provided by this embodiment has good extension and reusability, thereby meeting the use requirement of the user for independent display on multiple monitors.

Figure 7:
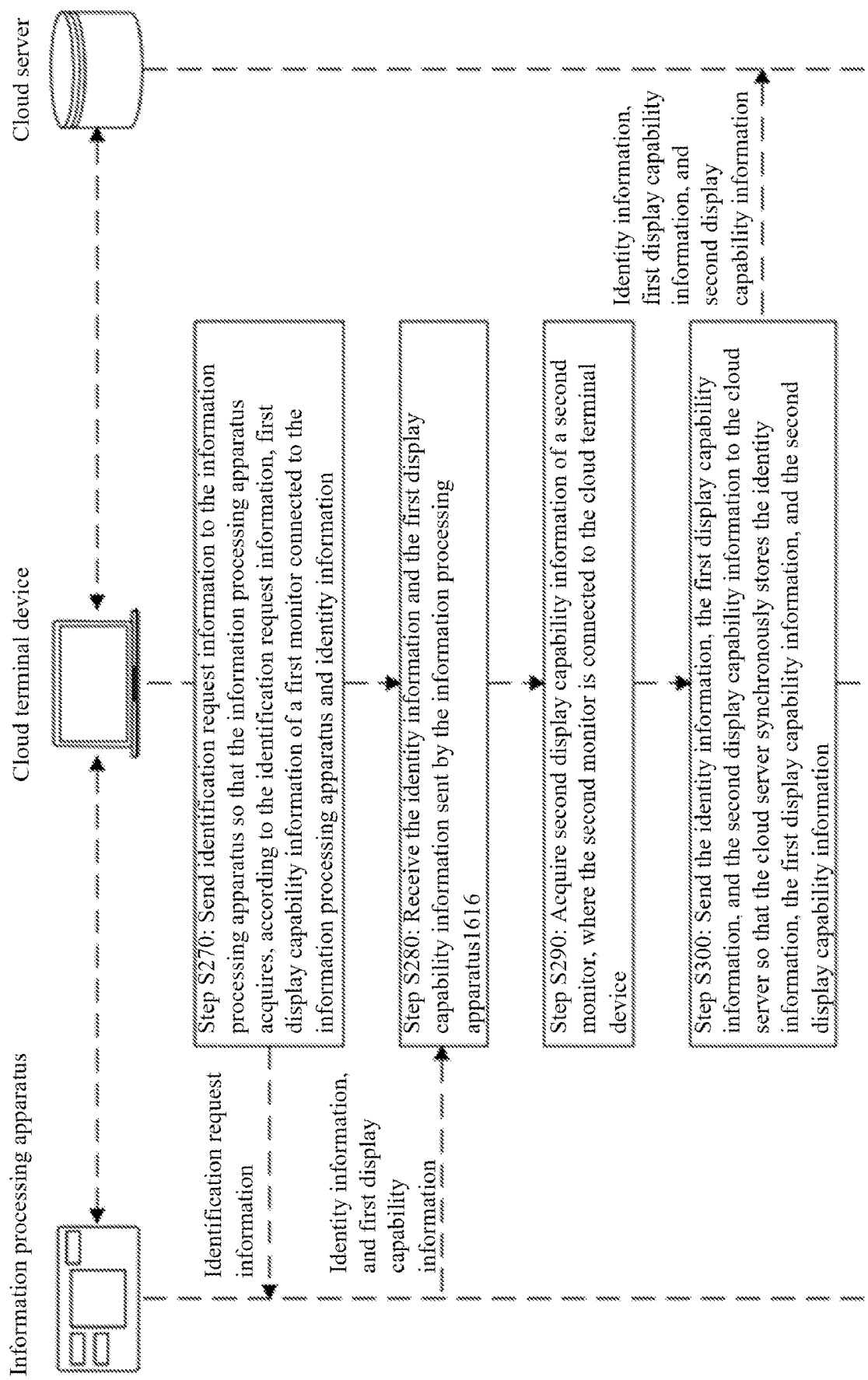
FIG. 7 is a flowchart of an information processing method according to another embodiment of the present disclosure.

In an embodiment, as shown in FIG. 7, the information processing method is further described. The information processing method may further include but is not limited to S270 to S300 before the execution of S210.

At S270, identification request information is sent to the information processing apparatus so that the information processing apparatus acquires, according to the identification request information, first display capability information of a first monitor connected to the information processing apparatus and identity information.

In this step, after the cloud terminal device is connected to the information processing apparatus, the cloud terminal device may send the identification request information to the information processing apparatus for performing identification processing on the information processing apparatus. Then the information processing apparatus can obtain the first display capability information of the first monitor connected to the information processing apparatus and the identity information according to the identification request information. The identity information and the first display capability information sent by the information processing apparatus can be received in a subsequent step, so that the information processing apparatus can be managed according to the identity information and the first display capability information.

It should be noted that the identity information is used to uniquely identify the information processing apparatus, and different information processing apparatuses have different identity information. The first display capability information may include capability information supported by the first monitor such as resolution information and DPI information, which is not specifically limited in this embodiment.

At S280, the identity information and the first display capability information sent by the information processing apparatus are received.

In this step, the identity information and the first display capability information sent by the information processing apparatus can be received since the identification request information is sent to the information processing apparatus in S270 and the information processing apparatus acquires the identity information and the first display capability information according to the identification request information. Therefore, the information processing apparatus can be managed according to the identity information and the first display capability information, and cloud desktop information matching the first monitor can be requested from the cloud server.

It should be noted that after receiving the identity information sent by different information processing apparatuses, the cloud terminal device may further directly process the information processing apparatuses through self-defined numbering or self-defined timing order, or process the information processing apparatuses through self-defined numbering or self-defined timing order according to the identity information, so as to effectively manage the information processing apparatuses.

At S290, second display capability information of a second monitor is acquired. The second monitor is connected to the cloud terminal device.

In this step, the cloud terminal device may further obtain second display capability information of the second monitor connected to the cloud terminal device. The second display capability information can be sent to the cloud server in a subsequent step, so that the cloud server can generate cloud desktop information for displaying on the second monitor according to the second display capability information.

It should be noted that S290 may be executed before S280, may be executed after S280, or may be executed synchronously with S280. An appropriate execution order may be selected according to an actual application situation, which is not specifically limited in this embodiment.

It should be noted that the second display capability information may include capability information supported by the second monitor such as resolution information and DPI information, which is not specifically limited in this embodiment.

At S300, the identity information, the first display capability information, and the second display capability information are sent to the cloud server so that the cloud server synchronously stores the identity information, the first display capability information, and the second display capability information.

In this step, since the identity information of the information processing apparatus and the first display capability information of the first monitor are received in S280, and the second display capability information of the second monitor is acquired in S290, the identity information, the first display capability information, and the second display capability information can be sent to the cloud server. The cloud server can synchronously store the information, so that the cloud server can send a plurality of different cloud desktop information to be processed to the cloud terminal device according to the identity information, the first display capability information, and the second display capability information in a subsequent step. In this way, the cloud terminal device and the information processing apparatus can respectively display different cloud desktop information to be processed and realize the function of independent display on multiple monitors.

It should be noted that the first cloud desktop information in S230 is generated by the cloud server according to the identity information and the first display capability information, and the second cloud desktop information is generated by the cloud server according to the second display capability information.

In this embodiment, according to the information processing method including steps S270 to S300, after being connected to the information processing apparatus, the cloud terminal device sends the identification request information to the information processing apparatus to obtain the identity information of the information processing apparatus and the first display capability information of the first monitor connected to the information processing apparatus; and then acquires the second display capability information of the second monitor connected to the cloud terminal device. Then, the cloud terminal device sends the identity information, the first display capability information, and the second display capability information to the cloud server. The cloud server synchronously stores the identity information, the first display capability information, and the second display capability information, so that the cloud server can send the plurality of pieces of different cloud desktop information to be processed to the cloud terminal device according to the identity information, the first display capability information, and the second display capability information. In this way, the cloud terminal device and the information processing apparatus can respectively display different cloud desktop information to be processed and realize the function of independent display on multiple monitors. In addition, the cloud terminal device stores the identity information and the first display capability information sent by the information processing apparatus after receiving the identity information and the first display capability information. Therefore, the cloud terminal device can manage the information processing apparatus according to the identity information. For example, when the cloud terminal device is connected to a plurality of information processing apparatuses, the cloud terminal device can correspondingly send cloud desktop information to the information processing apparatuses according to the identity information, so that different information processing apparatuses can display different cloud desktop information, thereby meeting the use requirement of the user for independent display on multiple monitors.

Figure 8:
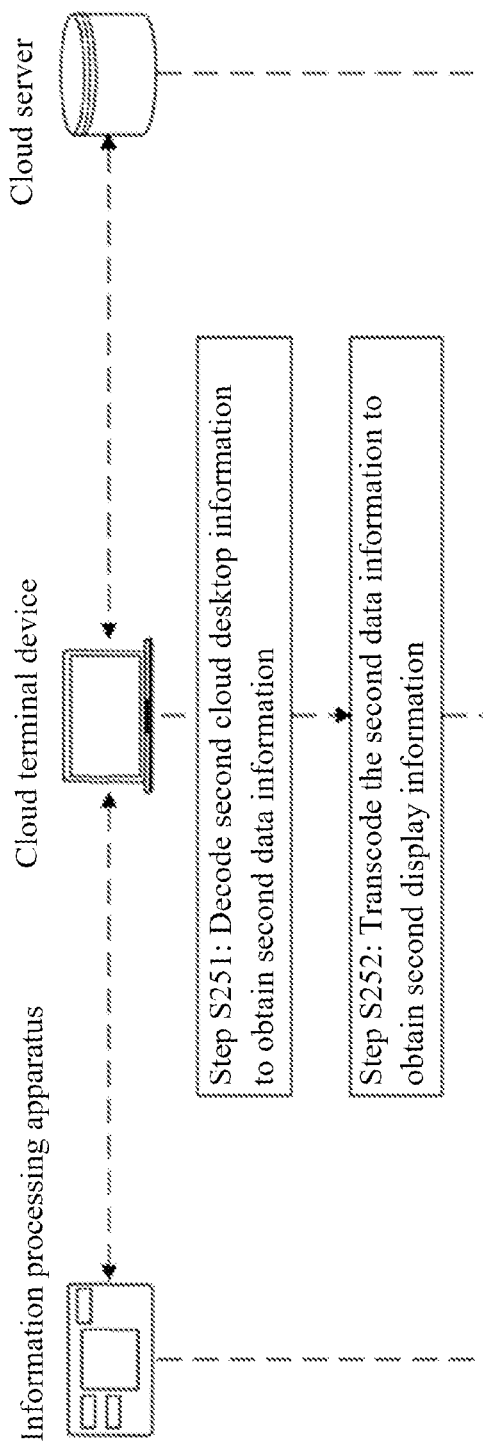
FIG. 8 is a flowchart of a specific method of S250 in FIG. 6.

In an embodiment, as shown in FIG. 8, S250 is further described, which may include, but is not limited to the following steps:

At S251, the second cloud desktop information is decoded to obtain second data information.

At S252, the second data information is transcoded to obtain the second display information.

It should be noted that after the cloud terminal device selects the second cloud desktop information in S230, the cloud terminal device can decode the second cloud desktop information to obtain data information that can be displayed by the second monitor. However, in some cases, the data information obtained by decoding the second cloud desktop information by the cloud terminal device may not meet a display parameter requirement of the second monitor, which may lead to abnormal display. In order to overcome this problem, in this embodiment, after the second cloud desktop information is decoded to obtain the second data information, the second data information is transcoded to obtain the second display information, so that the second display information can meet the display parameter requirement of the second monitor. This avoids abnormal display and improves use experience of the user.

It should be noted that decoding processing is a process of restoring data to content represented by the data, or converting electrical pulse signals, optical signals, radio waves, or the like into information, data, or the like represented by them. Transcoding process is a process of converting a signal from one data format to another data format.

Further, in an embodiment, S260 is further described, which may include but is not limited to the following steps:
the second display information is written into a second graphics card memory so that the second monitor performs image display according to the second display information in the second graphics card memory, where the second graphics card memory is disposed in the cloud terminal device.

In this embodiment, because the second display information is obtained by performing signal form conversion on the second cloud desktop information in S250, the second display information can be written into the second graphics card memory disposed in the cloud terminal device, so that the second monitor connected to the cloud terminal device can perform image display according to the second display information in the second graphics card memory. As the second monitor performs image display according to the second display information in the second graphics card memory, this is independent of the information processing apparatus displaying the first cloud desktop information, thereby meeting the use requirement of the user for independent display on multiple monitors.

Figure 9:
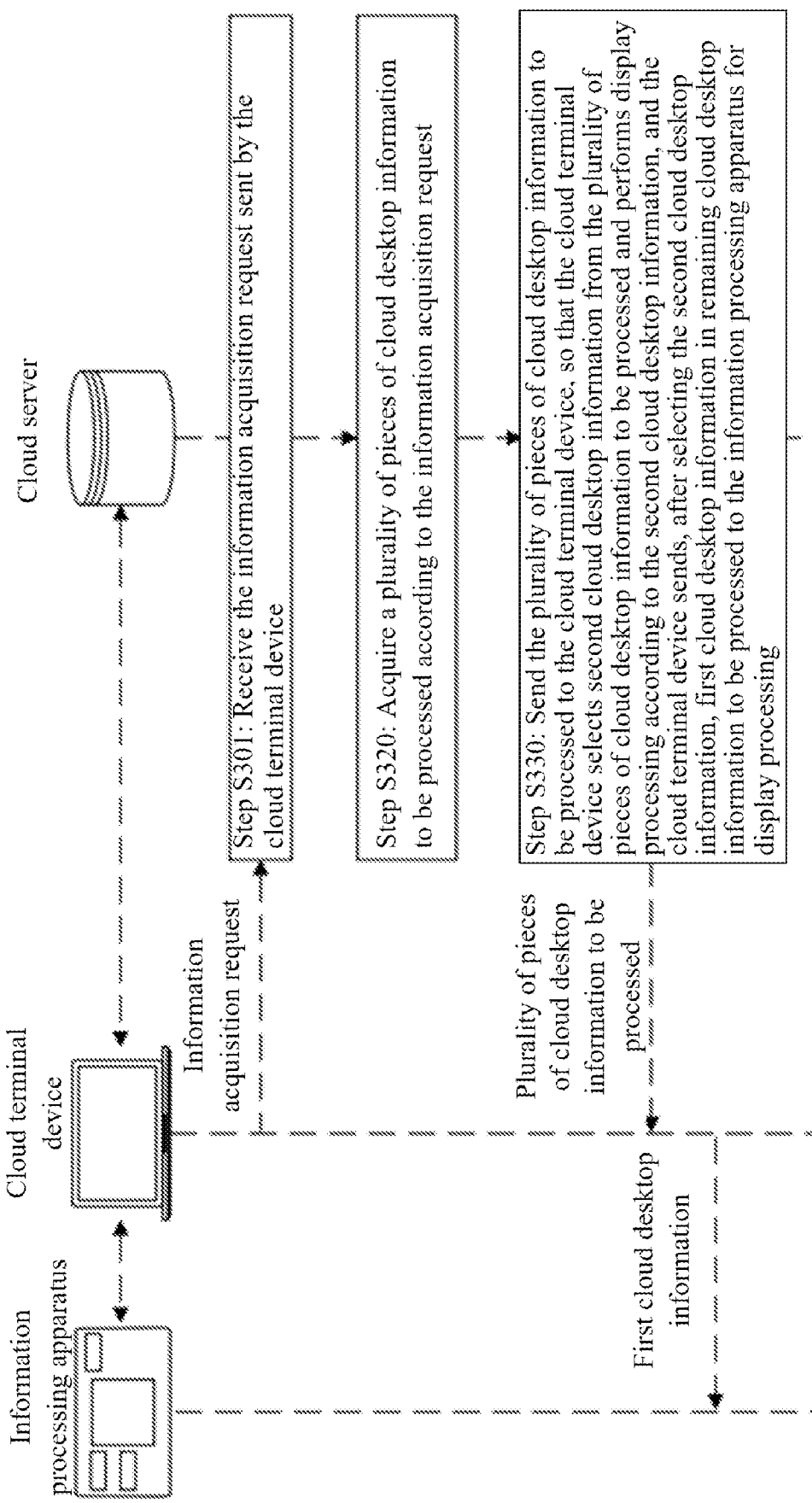
FIG. 9 is a flowchart of an information processing method according to another embodiment of the present disclosure.

FIG. 9 is a flowchart of still another information processing method according to an embodiment of the present disclosure. The information processing method may be applied to, for example, the cloud server 130 in the system architecture shown in FIG. 1. The information processing method may include but is not limited to steps S310 to S330.

At S310, an information acquisition request sent by a cloud terminal device is received.

In this step, when a user uses the cloud terminal device to use a cloud desktop service, the cloud terminal device sends, to the cloud server, the information acquisition request for acquiring a plurality of pieces of cloud desktop information. The cloud server receives the information acquisition request sent by the cloud terminal device, to acquire corresponding cloud desktop information according to the information acquisition request in a subsequent step.

At S320, a plurality of pieces of cloud desktop information to be processed are acquired according to the information acquisition request.

In this step, since the information acquisition request sent by the cloud terminal device is received in S310, a plurality of pieces of cloud desktop information to be processed can be acquired according to the information acquisition request. Then the pieces of cloud desktop information to be processed can be sent to the cloud terminal device in a subsequent step, so that the cloud terminal device can distribute the pieces of cloud desktop information to be processed to different information processing apparatuses, thereby meeting a use requirement of the user for independent display on multiple monitors.

It should be noted that the information acquisition request sent by the cloud terminal device may carry identity information of the cloud terminal device and identity information of the information processing apparatuses. The cloud server can correspondingly acquire the plurality of pieces of cloud desktop information to be processed according to the identity information of the cloud terminal device and the identity information of the information processing apparatuses. After the pieces of cloud desktop information to be processed are sent to the cloud terminal device in a subsequent step, the cloud terminal device can distribute the pieces of cloud desktop information to be processed to the corresponding information processing apparatuses, thereby meeting the use requirement of the user for independent display on multiple monitors.

It should be noted that the plurality of pieces of cloud desktop information to be processed acquired according to the information acquisition request may be the same piece of cloud desktop information or may be different pieces of cloud desktop information, which can be determined according to requirements of the cloud terminal device and the information processing apparatus, and is not specifically limited in this embodiment.

At S330, the plurality of pieces of cloud desktop information to be processed are sent to the cloud terminal device, so that the cloud terminal device selects second cloud desktop information from the plurality of pieces of cloud desktop information to be processed and performs display processing according to the second cloud desktop information, and the cloud terminal device sends, after selecting the second cloud desktop information, first cloud desktop information in remaining cloud desktop information to be processed to an information processing apparatus for display processing.

In this step, since the plurality of pieces of cloud desktop information to be processed are acquired in S320, the pieces of cloud desktop information to be processed can be sent to the cloud terminal device, so that the cloud terminal device can perform relevant display processing and distribution processing on the pieces of cloud desktop information to be processed. For example, after receiving the cloud desktop information to be processed, the cloud terminal device may first select the corresponding second cloud desktop information from the cloud desktop information to be processed according to the identity information of the cloud terminal device, and perform display processing according to the selected second cloud desktop information. In addition, after selecting the second cloud desktop information, the cloud terminal device may also select the first cloud desktop information corresponding to the information processing apparatus from remaining cloud desktop information to be processed according to the identity information of the information processing apparatus, and send the first cloud desktop information to the information processing apparatus for display processing. In addition, if other cloud desktop information to be processed remains, the cloud terminal device correspondingly distributes the remaining cloud desktop information to be processed to another information processing apparatus for display processing according to identity information of the other information processing apparatus, thereby meeting the use requirement of the user for independent display on multiple monitors.

In this embodiment, according to the information processing method including S310 to S330, after receiving the information acquisition request sent by the cloud terminal device, the cloud server acquires the plurality of pieces of cloud desktop information to be processed according to the information acquisition request, and then sends the plurality of pieces of cloud desktop information to be processed to the cloud terminal device, so that the cloud terminal device selects the second cloud desktop information from the plurality of pieces of cloud desktop information to be processed and performs display processing according to the second cloud desktop information, and the cloud terminal device sends, after selecting the second cloud desktop information, the first cloud desktop information in the remaining cloud desktop information to be processed to the information processing apparatus for display processing. In other words, the cloud terminal device and the information processing apparatus can respectively display different cloud desktop information, so that independent display on multiple monitors can be achieved by using the information processing apparatus without upgrading a hardware configuration of the cloud terminal device.

Figure 10:
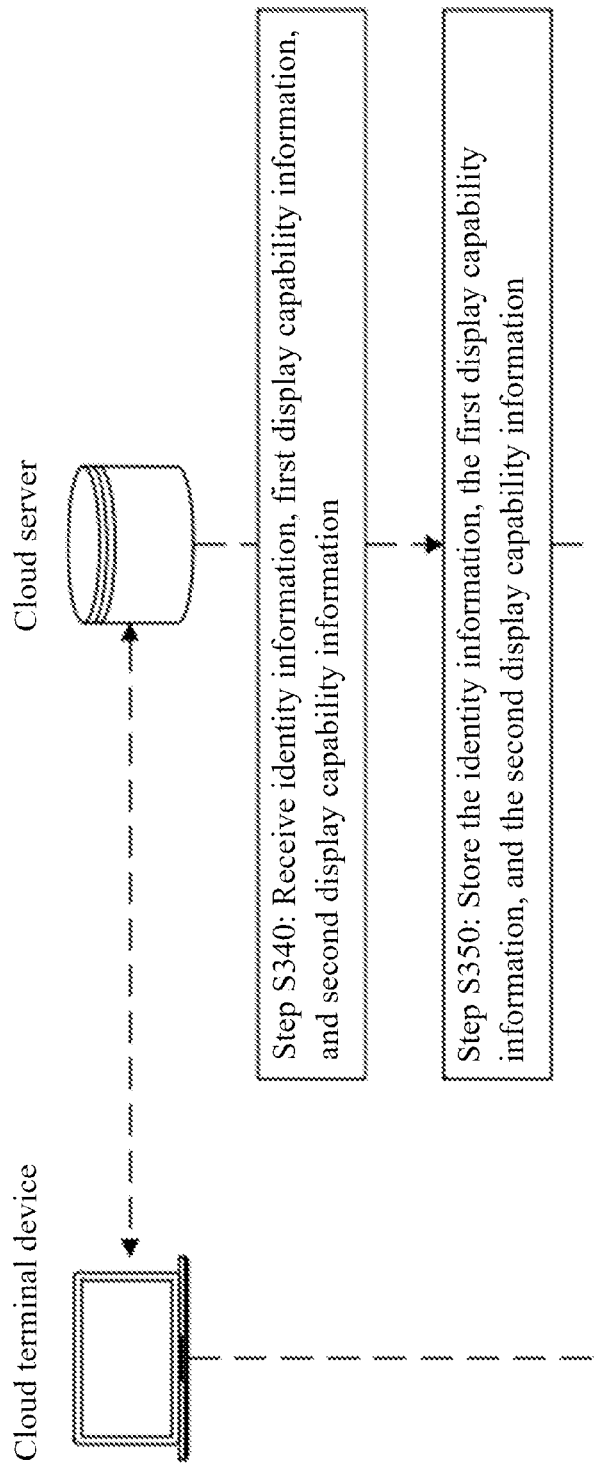
FIG. 10 is a flowchart of an information processing method according to another embodiment of the present disclosure.

In an embodiment, as shown in FIG. 10, the information processing method is further described. The information processing method may further include but is not limited to S340 and S350 before the execution of S310.

At S340, identity information, first display capability information, and second display capability information are received.

It should be noted that the identity information is acquired by the information processing apparatus based on the identification request information sent by the cloud terminal device. The first display capability information is acquired by the information processing apparatus from a first monitor according to the identification request information sent by the cloud terminal device. The first monitor is connected to the information processing apparatus. The second display capability information is obtained by the cloud terminal device from a second monitor connected to the cloud terminal device.

It should be noted that the first cloud desktop information in S330 is generated by the cloud server according to the identity information and the first display capability information, and the second cloud desktop information is generated by the cloud server according to the second display capability information.

In this step, before receiving the information acquisition request sent by the cloud terminal device, the cloud server may first receive the identity information of the information processing apparatus, the first display capability information of the first monitor, and the second display capability information of the second monitor, so that when receiving the information acquisition request sent by the cloud terminal device, the cloud server can obtain the plurality of pieces of corresponding cloud desktop information to be processed according to the identity information of the information processing apparatus, the first display capability information of the first monitor, and the second display capability information of the second monitor.

It should be noted that, after receiving the identity information and the first display capability information sent by the information processing apparatus, the cloud terminal device may further upload the identity information and the first display capability information to a management center. Therefore, when executing S340, the cloud server can receive the identity information, the first display capability information, and the second display capability information from the cloud terminal device or can receive the identity information, the first display capability information, and the second display capability information from the management center, which can be appropriately selected according to an actual application situation, and is not specifically limited in this embodiment.

At S350, the identity information, the first display capability information, and the second display capability information are stored.

In this step, since the identity information, the first display capability information, and the second display capability information are received in S340, the identity information, the first display capability information, and the second display capability information can be stored. Therefore, when the information acquisition request sent by the cloud terminal device is received in the subsequent step, the plurality of pieces of different cloud desktop information to be processed can be sent to the cloud terminal device according to the identity information, the first display capability information, and the second display capability information. In this way, the cloud terminal device and the information processing apparatus can respectively display different cloud desktop information to be processed and realize the function of independent display on multiple monitors.

In order to more clearly explain the technical scheme provided by the embodiment of the present disclosure, specific examples are provided below for description.

Example I

Figure 11:
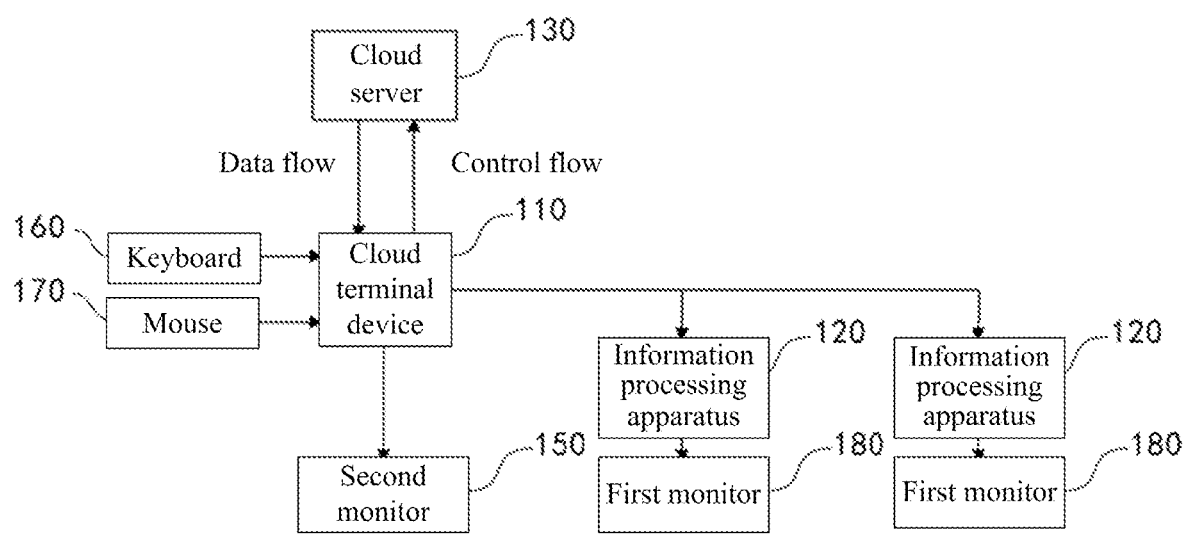
FIG. 11 is a schematic diagram of a system architecture according to a specific example of the present disclosure.

FIG. 11 is a schematic diagram of a system architecture according to a specific example of the present disclosure. In FIG. 11, a cloud terminal device 110 is first connected to a cloud server 130 in a conventional connection manner, that is, the cloud terminal device 110 is connected to the cloud server 130 through a network. The cloud terminal device 110 is connected to each of a second monitor 150, a keyboard 160, and a mouse 170. When a user has a requirement for independent display on multiple monitors, the cloud terminal device 110 is connected to information processing apparatuses 120, and then the information processing apparatuses 120 are connected to first monitors 180. The cloud terminal device 110 may be connected to the information processing apparatus 120 through a USB interface or through a network interface. The information processing apparatus 120 may be connected to the first monitor 180 through any one of a Digital Visual Interface (DVI), a DP interface, an HDMI interface, or a VGA interface. In addition, when connected to the information processing apparatuses 120, the cloud terminal device 110 may number the information processing apparatuses 120, and collect relevant parameter information of the first monitors 180 connected to the information processing apparatuses 120. Meanwhile, the cloud terminal device 110 may synchronously store the parameter information, and relevant device information of the information processing apparatuses 120 to the cloud server 130, so that an agent program in the cloud server 130 can set a corresponding display attribute for each monitor.

After receiving an information acquisition request sent by the cloud terminal device 110, the cloud server 130 generates, through encoding, multiple corresponding image bitstreams (that is, a plurality of pieces of cloud desktop information to be processed) according to the information acquisition request, and then sends the image bitstreams to the cloud terminal device 110 through a desktop transfer protocol. If the cloud terminal device 110 is not connected to the information processing apparatus 120, after receiving an image bitstream, the cloud terminal device 110 decodes the image bitstream and displays a decoded image bitstream through the second monitor 150. If the cloud terminal device 110 is connected to the information processing apparatus 120, the cloud terminal device 110 selects one image bitstream belonging to the cloud terminal device 110 from the image bitstreams, and performs decoding and display processing on the image bitstream. Then, the cloud terminal device 110 distributes the remaining other image bitstream to the corresponding information processing apparatuses 120 so that the information processing apparatus 120 performs decoding and display processing on the image bitstream.

In this example, the information processing apparatuses 120 are interconnected to the cloud terminal device 110 in the form of external interfaces, and used in conjunction with a set of input devices, meeting user's requirement for independent display on multiple monitors. This has good extension and reusability. In addition, as a hardware configuration upgrade of the cloud terminal device 110 is not required, overall costs of the cloud terminal device 110 can be reduced.

In addition, in this example, the cloud terminal device 110 and the information processing apparatus 120 may be connected first, and then the cloud terminal device 110 and the information processing apparatus 120 may be powered on uniformly. Alternatively, when the cloud terminal device 110 has been powered on, the information processing apparatus 120 may be hot-swapped to the cloud terminal device 110. In other words, a connection mode between the cloud terminal device 110 and the information processing apparatus 120 may be appropriately selected according to an actual application situation, which is not specifically limited in this embodiment.

Example II

Figure 12:
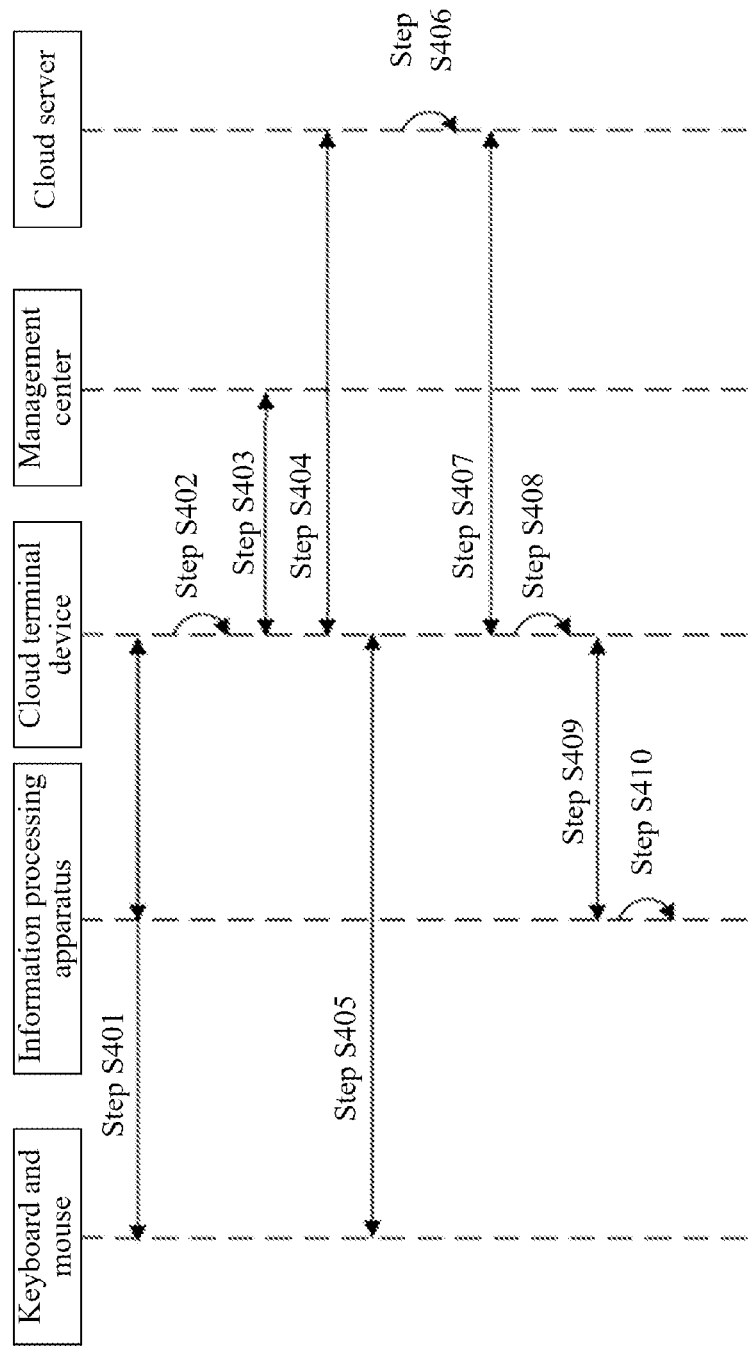
FIG. 12 is a flowchart of an information processing method according to another specific example of the present disclosure.

FIG. 12 is a flowchart of an information processing method according to another specific example of the present disclosure. The information processing method includes the following steps:

At S401, a cloud terminal device is interconnected to an information processing apparatus, and a keyboard and a mouse.

At S402, the cloud terminal device performs initialization, identifies and numbers the information processing apparatus, and stores resolution information, DPI information, and the like of a first monitor connected to the information processing apparatus.

At S403, the cloud terminal device exchanges information with a management center, performs operations such as service authentication and information query, and notifies the management center of information of an image to be displayed.

At S404, the cloud terminal device establishes a connection to a cloud server, and synchronizes ID information of the information processing apparatus, information of numbering of the information processing apparatus by the cloud terminal device, the resolution information of the first monitor, the DPI information of the first monitor, and the like to the cloud server, and the cloud server records and stores the information and synchronizes the information to a coding process or a coding module inside the cloud server.

At S405, in response to an operation of a user, the cloud terminal device sends a corresponding operation event to the cloud server through a desktop transfer protocol.

At S406, the coding process or the coding module in the cloud server performs, according to request information of the cloud terminal device and parameter information of the information processing apparatus recorded by the coding process or the coding module, coding processing on a plurality of pieces of cloud desktop information to be processed.

At S407, the cloud server sends the plurality of pieces of cloud desktop information to be processed to the cloud terminal device through the desktop transfer protocol.

At S408, the cloud terminal device selects second cloud desktop information from the pieces of cloud desktop information to be processed, decodes and transcodes the second cloud desktop information to obtain second display information, writes the second display information into a graphics card memory of the cloud terminal device, and displays the second display information through a second monitor connected to the cloud terminal device.

At S409, the cloud terminal device distributes remaining cloud desktop information to be processed to a corresponding information processing apparatus through a data channel.

At S410, the information processing apparatus decodes and transcodes corresponding cloud desktop information to be processed to obtain first display information, writes the first display information into a first graphics card memory of the information processing apparatus, and displays the first display information through the first monitor.

In addition, an embodiment of the present disclosure also provides an information processing apparatus including: a memory, a processor, and a computer program stored in the memory and executable by the processor.

The processor and the memory may be connected by a bus or by other means.

As a non-transitory computer-readable storage medium, the memory can be configured to store a non-transitory software program and a non-transitory computer-executable program. In addition, the memory may include a high-speed random-access memory and a non-transitory memory, for example, at least one magnetic disk storage device, a flash memory device, or another non-transitory solid-state storage device. In some implementations, the memory may optionally include memories remotely located with respect to the processor, and these remote memories may be connected to the processor via a network. Examples of the above-mentioned network include, but are not limited to, the Internet, an intranet, a local area network, a mobile communication network, and a combination thereof.

It should be noted that the information processing apparatus in this embodiment may be applied as, for example, the information processing apparatus 120 in the embodiment shown in FIG. 1, and can constitute, for example, a part of the system architecture in the embodiment shown in FIG. 1. These embodiments all belong to the same inventive concept, and therefore have the same implementation principle and technical effects, and will not be described in detail herein.

A non-transient software program and instructions required for implementing the information processing method of the above embodiment are stored in a memory, and when executed by a processor, cause the processor to perform the information processing method of the above embodiment, for example, to perform the above-described method steps S110 to S130 in FIGS. 3, S140 to S160 in FIG. 4, and S121 and S122 in FIG. 5.

In addition, an embodiment of the present disclosure also provides a cloud terminal device, including: a memory, a processor, and a computer program stored in the memory and executable by the processor.

The processor and the memory may be connected by a bus or by other means.

As a non-transitory computer-readable storage medium, the memory can be configured to store a non-transitory software program and a non-transitory computer-executable program. In addition, the memory may include a high-speed random-access memory and a non-transitory memory, for example, at least one magnetic disk storage device, a flash memory device, or another non-transitory solid-state storage device. In some implementations, the memory may optionally include memories remotely located with respect to the processor, and these remote memories may be connected to the processor via a network. Examples of the above-mentioned network include, but are not limited to, the Internet, an intranet, a local area network, a mobile communication network, and a combination thereof.

It should be noted that the cloud terminal device in this embodiment may be applied as, for example, the cloud terminal device 110 in the embodiment shown in FIG. 1, and can constitute, for example, a part of the system architecture in the embodiment shown in FIG. 1. These embodiments all belong to the same inventive concept, and therefore have the same implementation principle and technical effects, and will not be described in detail herein.

A non-transient software program and instructions required for implementing the information processing method of the above embodiment are stored in a memory, and when executed by a processor, cause the processor to perform the information processing method of the above embodiment, for example, to perform the above-described method steps S210 to S260 in FIGS. 6, S270 to S300 in FIG. 7, and S251 to S252 in FIG. 8.

In addition, an embodiment of the present disclosure also provides a cloud server, including: a memory, a processor, and a computer program stored in the memory and executable by the processor.

The processor and the memory may be connected by a bus or by other means.

As a non-transitory computer-readable storage medium, the memory can be configured to store a non-transitory software program and a non-transitory computer-executable program. In addition, the memory may include a high-speed random-access memory and a non-transitory memory, for example, at least one magnetic disk storage device, a flash memory device, or another non-transitory solid-state storage device. In some implementations, the memory may optionally include memories remotely located with respect to the processor, and these remote memories may be connected to the processor via a network. Examples of the above-mentioned network include, but are not limited to, the Internet, an intranet, a local area network, a mobile communication network, and a combination thereof.

It should be noted that the cloud server in this embodiment may be applied as, for example, the cloud server 130 in the embodiment shown in FIG. 1, and can constitute, for example, a part of the system architecture in the embodiment shown in FIG. 1. These embodiments all belong to the same inventive concept, and therefore have the same implementation principle and technical effects, and will not be described in detail herein.

A non-transient software program and instructions required for implementing the information processing method of the above embodiment are stored in a memory, and when executed by a processor, cause the processor to perform the information processing method of the above embodiment, for example, to perform the above-described method steps S310 to S330 in FIGS. 9 and S340 and S350 in FIG. 10.

The device embodiments described above are only for illustration. The units described as separate components may or may not be physically separated, that is, they may be located at one place or distributed to multiple network units. Some or all of the modules can be selected according to actual needs to achieve the purpose of the embodiment.

Furthermore, an embodiment of the present disclosure also provides a computer-readable storage medium which stores computer-executable instructions which, when executed by a processor or controller, for example, a processor of any of the device embodiments above, can cause the processor to perform the information processing method in any of the above embodiments, for example, to perform the above-described method steps S110 to S130 in FIGS. 3, S140 to S160 in FIGS. 4, S121 to S122 in FIG. 5, or to perform the above-described method steps S210 to S260 in FIGS. 6, S270 to S300 in FIGS. 7, S251 to S252 in FIG. 8, or to perform the above-described method steps S310 to S330 in FIG. 9, or S340 to S350 in FIG. 10.

Furthermore, an embodiment of the present disclosure also provides a computer program product, including a computer program or computer instructions, where the computer program or the computer instructions are stored in a computer-readable storage medium, a processor of a computer device reads the computer program or the computer instructions from the computer-readable storage medium, and the computer program or the computer instructions, when executed by the processor, cause the computer device to perform the information processing method as described in any of the previous embodiments.

An embodiment of the present disclosure includes: receiving, by an information processing apparatus, first cloud desktop information sent by a cloud terminal device, where the first cloud desktop information is one of remaining cloud desktop information to be processed after the cloud terminal device selects second cloud desktop information from a plurality of pieces of cloud desktop information to be processed, and the plurality of pieces of cloud desktop information to be processed are sent by a cloud server to the cloud terminal device according to an information acquisition request sent by the cloud terminal device; performing signal form conversion on the first cloud desktop information to obtain first display information; and performing display processing on the first display information. According to the scheme of this embodiment of the present disclosure, the information processing apparatus performs signal form conversion on the first cloud desktop information sent by the cloud terminal device and obtains the first display information, and then the information processing apparatus performs display processing on the first display information. The first cloud desktop information is one of the remaining cloud desktop information to be processed after the cloud terminal device selects the second cloud desktop information from the plurality of pieces of cloud desktop information to be processed sent by the cloud server. Therefore, the information processing apparatus may perform display processing on the first display information when the cloud terminal device performs display processing on the second cloud desktop information. In other words, independent display on multiple monitors can be achieved by using the information processing apparatus without upgrading a hardware configuration of the cloud terminal device. Therefore, the scheme of this embodiment of the present disclosure can meet a requirement of independent display on multiple monitors without increasing configuration and costs of the cloud terminal device.

It can be understood by those of ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage apparatuses, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and may include any information transmission media.

The above is a detailed description of some implementations of the present disclosure, but the present disclosure is not limited to the above-mentioned embodiments. Those having ordinary skill in the art can also make various equivalent modifications or replacements without departing from the spirit of the present disclosure, and these equivalent modifications or replacements are all included in the scope defined by the claims of the present disclosure.

What is claimed is:

1. An information processing method, applied to an information processing apparatus, wherein a cloud terminal device communicates with the information processing apparatus and a cloud server respectively, and the information processing apparatus performs display processing on cloud desktop information independently of the cloud terminal device, the information processing method comprising:
   receiving identification request information sent by the cloud terminal device;
   acquiring identity information, and first display capability information of a first monitor connected to the information processing apparatus, according to the identification request information;
   sending the identity information and the first display capability information to the cloud terminal device so that the cloud terminal device synchronously stores the identity information, the first display capability information, and second display capability information to the cloud server;
   receiving first cloud desktop information sent by the cloud terminal device, wherein the first cloud desktop information is one of remaining pieces of cloud desktop information to be processed after the cloud terminal device selects second cloud desktop information from a plurality of pieces of cloud desktop information to be processed, and the plurality of pieces of cloud desktop information to be processed are sent by the cloud server to the cloud terminal device according to an information acquisition request sent by the cloud terminal device;
   performing signal form conversion on the first cloud desktop information to obtain first display information; and
   performing display processing on the first display information;
   wherein, the second display capability information is obtained by the cloud terminal device from a second monitor connected to the cloud terminal device, and the second monitor is different from the first monitor.

2. The method of claim 1, wherein the first cloud desktop information is generated by the cloud server according to the identity information and the first display capability information.

3. The method of claim 1, wherein the second cloud desktop information is generated by the cloud server according to the second display capability information.

4. The method of claim 1, wherein, performing signal form conversion on the first cloud desktop information to obtain first display information comprises:
   decoding the first cloud desktop information to obtain first data information; and
   transcoding the first data information to obtain the first display information.

5. The method of claim 1, wherein, performing display processing on the first display information comprises:
   writing the first display information into a first graphics card memory so that the first monitor performs image display according to the first display information in the first graphics card memory, wherein the first graphics card memory is arranged in the information processing apparatus.

6. An information processing method, applied to a cloud terminal device which communicates with an information processing apparatus and a cloud server respectively, wherein the information processing apparatus performs display processing on cloud desktop information independently of the cloud terminal device, the information processing method comprising:
   sending identification request information to the information processing apparatus so that the information processing apparatus acquires identity information, and first display capability information of a first monitor connected to the information processing apparatus, according to the identification request information;
   receiving the identity information and the first display capability information sent by the information processing apparatus;

acquiring second display capability information of a second monitor, wherein the second monitor is connected to the cloud terminal device, and is different from the first monitor;

sending the identity information, the first display capability information, and the second display capability information to the cloud server so that the cloud server synchronously stores the identity information, the first display capability information, and the second display capability information;

sending an information acquisition request to a cloud server so that the cloud server acquires a plurality of pieces of cloud desktop information to be processed according to the information acquisition request;

receiving the plurality of pieces of cloud desktop information to be processed sent by the cloud server;

selecting first cloud desktop information and second cloud desktop information from the plurality of pieces of cloud desktop information to be processed, wherein the first cloud desktop information is one of remaining pieces of cloud desktop information to be processed after the cloud terminal device selects the second cloud desktop information from the plurality of pieces of cloud desktop information to be processed;

sending the first cloud desktop information to the information processing apparatus so that the information processing apparatus performs display processing according to the first cloud desktop information;

performing signal form conversion on the second cloud desktop information to obtain second display information; and performing display processing on the second display information.

7. The method of claim 6, wherein the second cloud desktop information is generated by the cloud server according to the second display capability information.

8. The method of claim 6, wherein the first cloud desktop information is generated by the cloud server according to the identity information and the first display capability information.

9. The method of claim 6, wherein, performing signal form conversion on the second cloud desktop information to obtain second display information comprises:

decoding the second cloud desktop information to obtain second data information; and transcoding the second data information to obtain the second display information.

10. The method of claim 6, wherein, performing display processing on the second display information comprises:

writing the second display information into a second graphics card memory so that the second monitor performs image display according to the second display information in the second graphics card memory, wherein the second graphics card memory is arranged in the cloud terminal device.

11. An information processing method, applied to a cloud server, wherein a cloud terminal device communicates with an information processing apparatus and the cloud server respectively, and the information processing apparatus performs display processing on cloud desktop information independently of the cloud terminal device, the information processing method comprising:

receiving identity information, first display capability information, and second display capability information;

storing the identity information, the first display capability information, and the second display capability information;

receiving an information acquisition request sent by a cloud terminal device;

acquiring a plurality of pieces of cloud desktop information to be processed according to the information acquisition request; and sending the plurality of pieces of cloud desktop information to be processed to the cloud terminal device, so that the cloud terminal device selects second cloud desktop information from the plurality of pieces of cloud desktop information to be processed and performs display processing according to the second cloud desktop information, and the cloud terminal device sends, after selecting the second cloud desktop information, first cloud desktop information in remaining cloud desktop information to be processed to an information processing apparatus for display processing;

wherein the identity information is acquired by the information processing apparatus according to identification request information sent by the cloud terminal device;

wherein the first display capability information is acquired by the information processing apparatus from a first monitor according to the identification request information sent by the cloud terminal device; and wherein the first monitor is connected to the information processing apparatus, the second display capability information is acquired by the cloud terminal device from a second monitor connected to the cloud terminal device, and the second monitor is different from the first monitor.

12. The method of claim 11, wherein the second cloud desktop information is generated by the cloud server according to the second display capability information.

13. The method of claim 11, wherein the first cloud desktop information is generated by the cloud server according to the identity information and the first display capability information.

14. An information processing apparatus, comprising a memory, a processor, and a computer program stored in the memory and executable by the processor, wherein the computer program, when executed by the processor, causes the processor to implement the information processing method of claim 1.

15. A cloud terminal device, comprising a memory, a processor, and a computer program stored in the memory and executable by the processor, wherein the computer program, when executed by the processor, causes the processor to implement the information processing method of claim 6.

16. A cloud server, comprising a memory, a processor, and a computer program stored in the memory and executable by the processor, wherein the computer program, when executed by the processor, causes the processor to implement the information processing method of claim 11.

17. A non-transitory computer-readable storage medium, storing computer-executable instructions configured to cause a computer to perform the information processing method of claim 1.

18. A non-transitory computer-readable storage medium, storing computer-executable instructions configured to cause a computer to perform the information processing method of claim 6.

19. A non-transitory computer-readable storage medium, storing computer-executable instructions configured to cause a computer to perform the information processing method of claim 11.

* * * * *